United States Patent
Al-Risheq et al.

(10) Patent No.: US 11,136,249 B1
(45) Date of Patent: Oct. 5, 2021

(54) DESTABILIZATION AND SEPARATION OF HIGH STABLE COLLOIDS

(71) Applicant: QATAR UNIVERSITY, Doha (QA)

(72) Inventors: Dana Izzat Al-Risheq, Doha (QA); Mustafa Nasser, Doha (QA); Hazim Qiblawey, Doha (QA); Abdelbaki Benamor, Doha (QA); Ibnelwaleed Ali Hussein, Doha (QA)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 16/883,484

(22) Filed: May 26, 2020

(51) Int. Cl.
| | |
|---|---|
| C02F 1/52 | (2006.01) |
| C02F 101/10 | (2006.01) |
| C02F 103/12 | (2006.01) |
| C02F 103/28 | (2006.01) |
| C02F 103/10 | (2006.01) |
| C02F 103/24 | (2006.01) |
| C02F 103/14 | (2006.01) |
| C02F 103/36 | (2006.01) |

(52) U.S. Cl.
CPC ........ C02F 1/5263 (2013.01); *C02F 2101/10* (2013.01); *C02F 2103/10* (2013.01); *C02F 2103/12* (2013.01); *C02F 2103/14* (2013.01); *C02F 2103/24* (2013.01); *C02F 2103/28* (2013.01); *C02F 2103/365* (2013.01); *C02F 2209/06* (2013.01); *C02F 2209/105* (2013.01); *C02F 2209/11* (2013.01)

(58) Field of Classification Search
CPC .................................................... C02F 1/5263
See application file for complete search history.

(56) References Cited

U.S. PATENT DOCUMENTS

| | | |
|---|---|---|
| 9,790,421 B2 | 10/2017 | Song et al. |
| 9,957,459 B2 | 5/2018 | Patil et al. |
| 2011/0207633 A1 | 8/2011 | Miller |
| 2014/0194289 A1 | 7/2014 | Sclapari et al. |
| 2014/0305650 A1 | 10/2014 | Song et al. |
| 2015/0021913 A1 | 7/2015 | Song et al. |

FOREIGN PATENT DOCUMENTS

| | | |
|---|---|---|
| CN | 107488682 A | 12/2017 |
| CN | 107497395 A | 12/2017 |
| CN | 107760739 A | 3/2018 |
| CN | 107904266 A | 4/2018 |
| CN | 108660837 A | 10/2018 |
| CN | 109692634 A | 4/2019 |
| CN | 109721145 A | 5/2019 |

(Continued)

OTHER PUBLICATIONS

Abbott, et al: "Selective extraction of metals from mixed oxide matrixes using choline-based ionic liquids", Inorganic Chemistry 2005; vol. 44, No. 19, pp. 6497-6499.

(Continued)

*Primary Examiner* — Peter Keyworth
(74) *Attorney, Agent, or Firm* — Squire Patton Boggs (US) LLP

(57) ABSTRACT

Provided herein are compositions and methods useful for the treatment of wastewater comprising colloidal impurities. In certain aspects and embodiments, the compositions and methods include a natural deep eutectic solvent (NADES) coagulant including a hydrogen bond acceptor and a hydrogen bond donor, wherein the NADES is a liquid at room temperature.

18 Claims, 13 Drawing Sheets

Addition Steps of NADES Coagulant

(56) References Cited

FOREIGN PATENT DOCUMENTS

| | | |
|---|---|---|
| CN | 110075154 A | 8/2019 |
| EP | 2505061 A1 | 10/2012 |
| TW | 2017/15100 A | 5/2017 |

OTHER PUBLICATIONS

Altamash, et al: "Gas solubility and Theological behavior of natural deep eutectic solvents (NADES) via combined experimental and molecular simulation techniques"; Chemistry Select Full Papers 2017; vol. 2, No. 24, pp. 7278-7295.

Bakirtzi, et al: "Novel lactic acid-based natural deep eutectic solvents: Efficiency in the ultrasound-assisted extraction of antioxidant polyphenols from common native Greek medicinal plants." Journal of Applied Research on Medicinal and Aromatic Plants 2016; vol. 3, No. 3, pp. 120-127.

Chen, et al: "Application of deep eutectic solvents in biomass pretreatment and conversion", Green Energy and Environment, Apr. 2019; vol. 4, Issue 2, pp. 95-115.

D'Haese, et al: "Human health risk associated with the management of phosphorus in fresh waters using lanthanum and aluminum", Chemosphere 2019; online Dec. 12, 2018; vol. 220, pp. 286-299.

Francisco, et al: "A new low transition temperature mixture (LTTM) formed by choline chloride+ lactic acid: Characterization as solvent for CO2 capture", Fluid Phase Equilibria 2013; vol. 340, pp. 77-84.

Levesque, et al: "Ligand specific effects on aluminum incorporation and toxicity in neurons and astrocytes", Brain Research 2000; vol. 877, pp. 191-202.

Mukhopadhyay, et al: "Ammonium-based deep eutectic solvents as novel soil washing agent for lead removal", Chemical Engineering Journal 2016; vol. 294, pp. 316-322.

Nasser, "Characterization of floc size and effective floc density fo industrial papermaking suspensions", Separation and Purification Technology 2014; vol. 122, pp. 495-505.

Nasser, et al: "Settling and sediment bed behaviour of kaolinite in aqueous media". Separation and Purification Technology 2006; vol. 51, No. 1, pp. 10-17.

Nayak, "Review—Aluminum: Impacts and Disease", Environmental Research 2002; Section A-89, pp. 101-115.

Percy, et al: "Towards the prevention of potential aluminum toxic effects and an effective treatment for Alzheimer's disease", Journal of Inorganic Biochemistry 2011; vol. 105, pp. 1505-1512.

Shaikh, et al: "Investigation of the effect of polyelectrolyte structure and type on the electrokinetics and flocculation behavior of bentonite dispersions." Chemical Engineering Journal 2017; vol. 311, pp. 265-276.

Walton, "Brain lesions comprised of aluminum-rich cells that lack microtubules may be associated with the cognitive deficit of Alzheimer's disease", NeuroToxicology 2009; vol. 30, 1059-1069.

Zand, et al: "Comparing aluminium sulfate and poly-aluminium chloride (PAC) performance in turbidity removal from synthetic water", Journal of Applied Biotechnology Reports 2015; vol. 2, No. 3, pp. 287-292.

Addition Steps of NADES Coagulant

Bentonite Suspension with ChCl Coagulant at Different Concentrations

Bentonite Suspension with NADES Coagulant at Different Concentrations

Bentonite Suspension with LA Coagulant at Different Concentrations

DESTABILIZATION AND SEPARATION OF HIGH STABLE COLLOIDS

FIELD

Provided herein are compounds, composites, compositions, and methods useful, for example, for the treatment of wastewater comprising colloidal impurities.

BACKGROUND OF THE INVENTION

Separation of highly stabilized colloidal particles from industrial wastewaters is of great importance. Clay colloidal particles, such as bentonite, have numerous applications in various industries, including cosmetics, pharmaceuticals, cement and concrete, functional fillers, papermaking, food industry, water treatment and improving drilling mud properties. These applications have not only raised the volume of water contaminated with clay minerals but also its treatment complexity owing to the formation of highly stable clay suspensions in such wastewater.

The development of coagulating/flocculating agents is considered to be among the most important breakthroughs in solid-liquid separation processes resulting in an improved treatment of industrial wastewater effluents. There, is a continuing need for effective compositions and methods for clay-based dispersions which are known to be a high stable colloidal system.

SUMMARY OF THE INVENTION

Provided herein are compositions and methods useful for the treatment of wastewater comprising colloidal impurities.

In certain aspects and embodiments, the compositions provide a natural deep eutectic solvent (NADES) coagulant including a hydrogen bond acceptor and a hydrogen bond donor, wherein the NADES is a liquid at room temperature. In certain embodiments, the NADES showed high efficiency in removing suspended colloidal clays of less than 2 micron over wide pH ranges (e.g., a range of high pH from 3 to 9).

In certain aspects, provided herein is a method for removal of suspended colloidal particles from wastewater effluents, the method including
  treating the wastewater with a green natural deep eutectic solvent (NADES) coagulant including a hydrogen bond acceptor and a hydrogen bond donor;
  stirring the treated wastewater;
  settling the treated wastewater; and
  extracting the supernatant.

In certain aspects, provided herein is a method of preparing a green, natural deep eutectic solvent (NADES) coagulant comprising desiccating choline chloride mixing choline chloride with lactic acid; heating the mixture of choline chloride and lactic acid; and cooling the produced NADES to room temperature.

DETAILED DESCRIPTION

Figure 1:
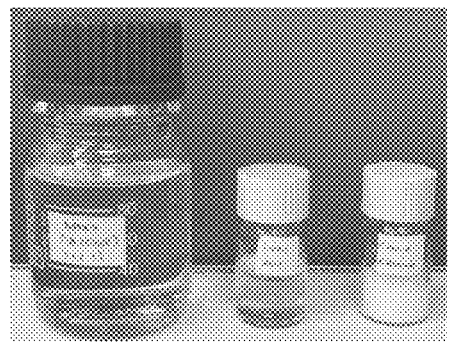
FIG. 1 shows the 1:1 LA:ChCl NADES (left) and its original components at room temperature LA (center) and ChCl (right).

Provided herein are compositions and methods useful for purifying high colloid wastewater.

Definitions

When referring to the compounds provided herein, the following terms have the following meanings unless indicated otherwise. Unless defined otherwise, all technical and scientific terms used herein have the same meaning as is commonly understood by one of ordinary skill in the art. In the event that there is a plurality of definitions for a term herein, those in this section prevail unless stated otherwise.

The term "coagulation" or "flocculation" as used herein refers to the aggregation of particles in a colloid leading to the destabilization of the colloid by the formulation of particles larger than colloidal size.

The term "eutectic" with respect to a composition refers to a composition in a fixed ratio that has a melting point that is lower than the melting point of its individual components.

The term "floc" as used herein refers to a particle larger than colloidal size that is produced by aggregation of particles in a colloid.

The term "substantially free of" or "substantially in the absence of" with respect to a composition refers to a composition that includes at least 85 or 90% by weight, in certain embodiments, 91%, 92%, 93%, 94%, 95%, 96%, 97%, 98%, 99% or 100% by weight, of the compound. In certain embodiments, in the methods and compounds provided herein, the compounds are substantially free of highly stable colloids (e.g., bentonite and the like).

Compositions

In certain aspects and embodiments, the compositions provide a natural deep eutectic solvent (NADES) coagulant including a hydrogen bond acceptor and a hydrogen bond donor, wherein the NADES is a liquid at room temperature. In certain embodiments, the NADES coagulent is competitively priced.

In certain embodiments, the removal of efficiency of NADES coagulent is higher than known commercial coagulents, such as alumina sulfate and aluminium chloride. The current applied coagulants such as alumina sulfate and aluminium chloride operate in a fixed range of pH from 5 to 8 (Nasser, Sep. and Purif Tech., 122 (2014)). It was shown that, above pH 8 the % TSS removal of colloidal clays was almost decreased to less than 50% when aluminium sulfate was used as coagulant. In certain embodiments, the NADES showed high efficiency in removing suspended colloidal clays of less than 2 micron over wide pH ranges, such as a 100% total suspended solids (TSS) removal at a range of high pH from 3 to 9.

In certain aspects and embodiments, provided herein is a green, inexpensive choline chloride (ChCl) based natural deep eutectic solvent (NADES) as a coagulant for clay-based dispersions which are known to be a high stable colloidal system. In certain embodiments, the composition provides a coagulant in which the hydrogen bond acceptor is choline chloride. In certain embodiments, the hydrogen bond acceptor is green, inexpensive, and efficient.

In certain embodiments, the composition provides a coagulant in which the hydrogen bond donor is selected from the group consisting of lactic acid, malic acid, citric acid, acetic acid, phenylacetic acid, trifluoroacetic acid, trichloroacetic acid, and combinations thereof. In certain embodiments, the hydrogen bond donor is selected from the group consisting of acetic acid, phenylacetic acid, trifluoroacetic acid, trichloroacetic acid, and combinations thereof. In certain embodiments, the hydrogen bond donor is acetic acid. In certain embodiments, the composition provides a coagulant in which the hydrogen bond donor is selected from the group consisting of lactic acid, malic acid, citric acid, and combinations thereof. In certain embodiments, the hydrogen bond donor is lactic acid.

In certain embodiments, the composition provides a coagulant in which the hydrogen bond acceptor and the hydrogen bond donor are hydrogen bonded.

In the preparation of one embodiment of the NADES, lactic acid (LA) and ChCl were used as the hydrogen bond donor and acceptor, respectively, with a 1:1 ratio. For comparison, the original components of NADES (i.e., ChCl & LA) were also tested individually as coagulants as well as a mixture of both the hydrogen bond donor and acceptor (HBD and HBA). Zeta potential, turbidity measurements, and particles size distribution tests were conducted to evaluate the performance of each combinations as a coagulant.

In certain embodiments, the coagulant is formed in the presence of the colloid (e.g., by addition of ChCl and LA to a colloid).

Methods

In certain aspects, provided herein is a method for removal of suspended colloidal particles from wastewater effluents, the method including
  treating the wastewater with a green natural deep eutectic solvent (NADES) coagulant including a hydrogen bond acceptor and a hydrogen bond donor;
  stirring the treated wastewater;
  settling the treated wastewater; and
  extracting the supernatant.

In certain embodiments, the suspended colloidal particles include bentonite, kaolinite, barite, precipitated calcium carbonate, and combinations thereof. In certain embodiments, the suspended colloidal particles include bentonite.

In certain embodiments, the turbidity of the treated wastewater is zero (i.e., about 100% turbidity removal) as measured by a turbidity meter.

In certain embodiments, the resulting settled sediment includes flocs with a mean floc size of 36 um (e.g., as measured by a combined jar test and Mastersizer apparatus).

In certain embodiments, the coagulant is the NADES at optimum dose.

In certain embodiments, the hydrogen bond acceptor is choline chloride.

In certain embodiments, the hydrogen bond donor is selected from the group consisting of lactic acid, malic acid, citric acid, and an acetic acid comprising acetic acid, phenylacetic acid, trifluoroacetic acid, trichloroacetic acid, and combinations thereof. In certain embodiments, the acetic acid is acetic acid.

In certain embodiments, the choline chloride:hydrogen bond donor is 1:1.

In certain embodiments, the method further includes aggregating via an electrostatic patch coagulation mechanism.

In certain embodiments, the treated wastewater has a zeta potential of about −18 mV (e.g., as measured by a Zetasizer).

In certain embodiments, the treated wastewater is stirred at high speed for about thirty seconds. In certain embodiments, the treated wastewater was stirred at 180 rpm.

In certain embodiments, the treated wastewater was then stirred at low speed for twenty minutes.

In certain embodiments, the treated wastewater is stirred at 50 rpm. In certain embodiments, the treated wastewater is settled for two minutes.

In certain embodiments, the wastewater before treatment has a pH of about 9.

In certain embodiments, the wastewater is selected from the group consisting of oil and gas processing effluent, pulp and paper processing effluent, mineral processing effluent, tailing and tanning processing effluent, paint processing effluent, ceramic processing effluent.

In certain aspects, provided herein is a method of preparing a green, natural deep eutectic solvent (NADES) coagulant comprising desiccating choline chloride mixing choline chloride with lactic acid; heating the mixture of choline chloride and lactic acid; and cooling the produced NADES to room temperature.

In certain embodiments, the desiccation time for choline chloride is about forty-eight hours. In certain embodiments, the ratio of choline chloride:lactic acid is about 1:1.

In certain embodiments, the heating is at a temperature of about 80° C. In certain embodiments, the heating is at atmospheric pressure.

To evaluate NADES as coagulant to destabilize and remove highly stabilized colloidal particles, different experimental measurements have been carried out including:

Synthesis of Choline chloride (ChCl) and Lactic acid based NADES and test its thermal stability Testing ChCl and NADES as coagulant to destabilize and separate highly stable colloidal particles. Bentonite was used as a reference for comparison.

Jar test and Zeta potential measurements were used to measure the separation efficiency.

Floc size measurements were further used as a tool to assess the quality of the settled produced flocs (sediment).

EXAMPLES

As used herein, the symbols and conventions used in these processes, schemes and examples, regardless of whether a particular abbreviation is specifically defined, are consistent with those used in the contemporary scientific literature, for example, the Journal of the American Chemical Society or the Journal of Biological Chemistry. Specifically, but without limitation, the following abbreviations may be used in the examples and throughout the specification: g (grams); mg (milligrams); mL (milliliters); µL (microliters); mM (millimolar); µM (micromolar); Hz (Hertz); MHz (megahertz); mmol (millimoles); hr or hrs (hours); min (minutes); MS (mass spectrometry); ESI (electrospray ionization); TLC (thin layer chromatography); HPLC (high pressure liquid chromatography); THF (tetrahydrofuran); $CDCl_3$ (deuterated chloroform); AcOH (acetic acid); DCM (dichloromethane); DMSO (dimethylsulfoxide); DMSO-$d_6$ (deuterated dimethylsulfoxide); EtOAc (ethyl acetate); MeOH (methanol); and BOC (t-butyloxycarbonyl).

For all of the following examples, standard work-up and purification methods known to those skilled in the art can be utilized. Unless otherwise indicated, all temperatures are expressed in ° C. (degrees Centigrade). All reactions are conducted at room temperature unless otherwise noted. Synthetic methodologies illustrated herein are intended to exemplify the applicable chemistry through the use of specific examples and are not indicative of the scope of the disclosure.

Example 1: Synthesis of a Natural Deep Eutectic Solvent (NADES)

The proposed NADES used as coagulant has superior properties over the conventional inorganic coagulant in terms of turbidity removal and produced flocs size and structure. This IP deals with development of a green and economical formulation that is composed of choline chloride based NADES for the removal of suspended colloids from wastewater effluents. NADES is used as a destabilizer for highly stable bentonite suspensions. Several tests were conducted on the treated bentonite suspension such as turbidity, zeta potential measurements, and particle size distribution to evaluate the efficiency of the synthesized NADES as a coagulant.

Synthetic Method

Choline chloride based natural deep eutectic solvent NADES was synthesized by mixing choline chloride (HBA) with lactic acid (HBD) with a ratio of 1:1 (FIG. 1). As ChCl is a hygroscopic material, it was placed in a glass desiccator with silica gel for 48 hours before use to remove any moisture content in order to improve the efficiency of the formulation. The required amount of the hydrogen bond donor and acceptor were measured by using an ISOLAB analytical balance (minimum of 2 mg and maximum of 220 g) and then placed in a 1000 mL Heidolph rounded flask which was dried in a DRY-Line oven at 150° C. for 10 minutes to remove the water content. The flask was attached to a Heidolph rotatory evaporator, heated to 80° C. at an atmospheric pressure in an oil bath with continuous agitation at a constant rotational speed of 200 RPM for an hour until the mixture formed a clear transparent liquid. The liquid NADES was then transferred to a 100 mL SCOTT glass container and stored at room temperature.

NADES Thermal Stability

Density measurement and thermogravimetric analysis (TGA) were conducted on the synthesized NADES using Anton Paar DMA 4500M densitometer and PerkinElmer Pyris 6 TGA instrument, respectively.

The density measurements for the prepared NADES were performed over a temperature range from 20° C. to 80° C. at atmospheric pressure. The density at each temperature was measured a minimum of three times and the average value was reported. The TGA was conducted to obtain the onset and decomposition temperatures of NADES to determine its thermal stability. NADES was heated from 30° C. to 700° C. with an increment of 5° C. per minute under dried atmosphere using nitrogen gas as a blanket to generate weight loss curve.

Example 2: Comparison of NADES and Other Coagulants

The original components of the NADES—the hydrogen bond donor and acceptor—were used individually as a coagulant and compared to the NADES. Choline chloride or (2-hydroxyethyl) trimethylammonium chloride (CAS Number 67-48-1) with a purity of 98% and a melting point of 302-305° C. Lactic Acid (CAS Number 50-21-5) with a purity of 85% and Bentonite with chemical formula of (Na)0.7(A13.3 Mg0.7) Si8O20(OH)4.nH2O (CAS Number 1302-78-9) were purchased from Sigma Aldrich and used without further treatment.

Coagulant Preparation

Figure 2:
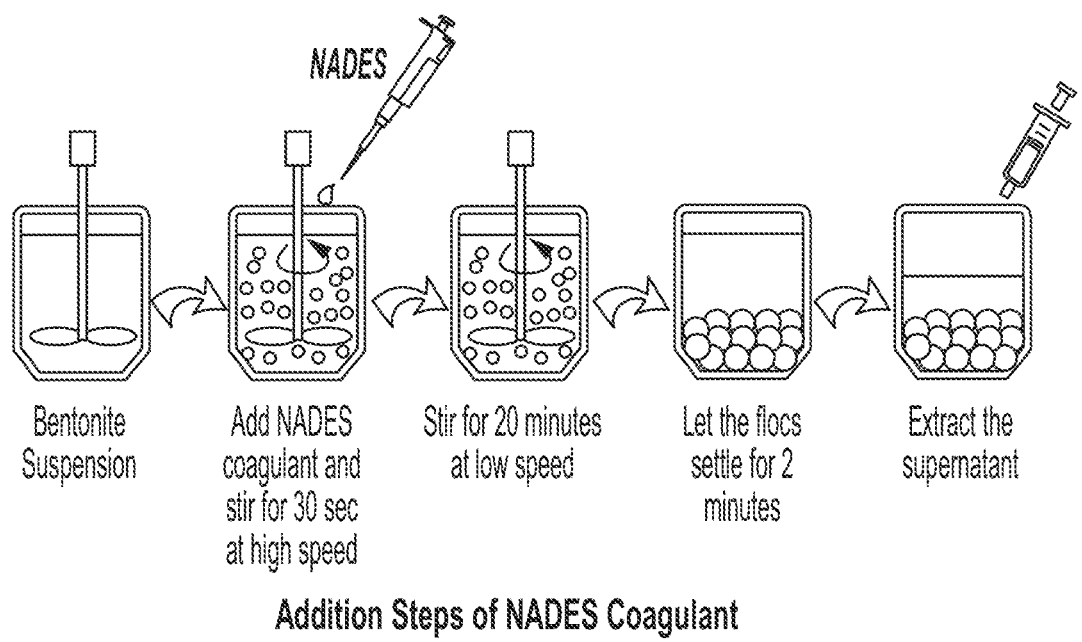
FIG. 2 shows an exemplary method of destabilizing a colloidal bentonite suspension with NADES.
Figure 3:
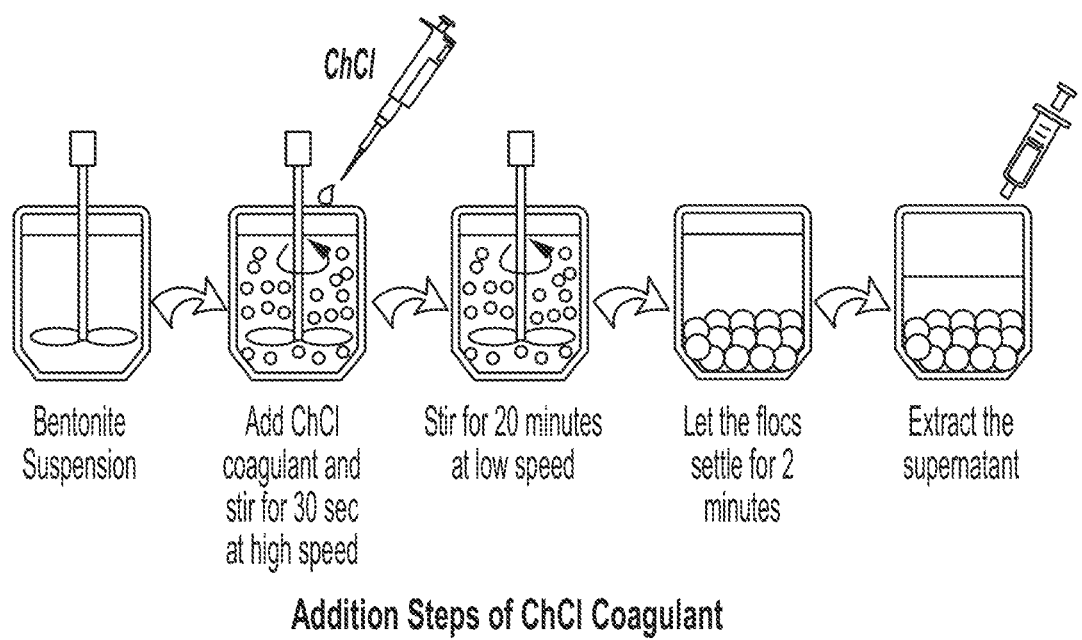
FIG. 3 shows an exemplary method of destabilizing a colloidal bentonite suspension with ChCl.

Four different coagulants were used in a bentonite suspension destabilization process: NADES, lactic acid (LA) and choline chloride (ChCl) individually, and a mixture of both ChCl and LA. Coagulants including NADES, LA, and ChCl were prepared by mixing 0.035 mol of the coagulant with 30 mL of deionized water in a 100 mL SCOTT glass container. Each coagulant was then added to the bentonite solution with varying amounts according to the desired concentration (FIGS. 2 and 3).

Figure 4:
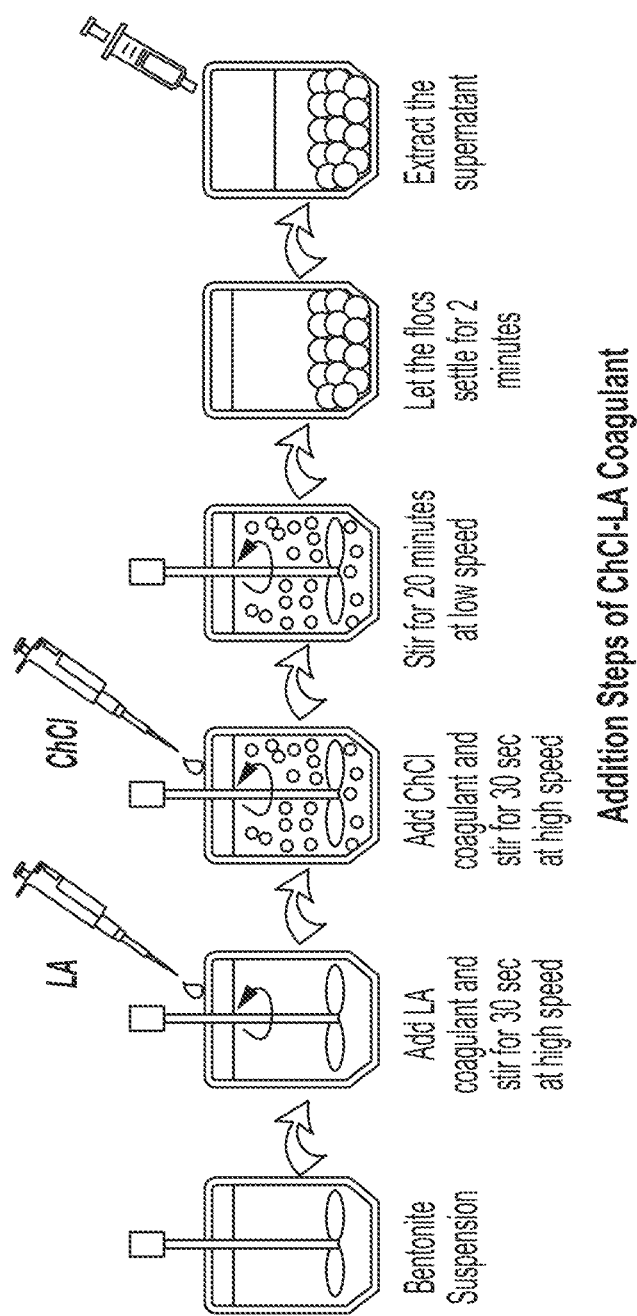
FIG. 4 shows an exemplary method of destabilizing a colloidal bentonite suspension with sequential addition of LA and ChCl.

For the mixed coagulant (ChCl-LA), equal parts of the lactic acid and choline chloride coagulants were used in the destabilization process. First, lactic acid coagulant was added to the bentonite suspension and mixed well for 30 seconds, followed by choline chloride coagulant (FIG. 4). The addition of LA followed by ChCl was found to be better than adding the two chemicals together or adding ChCl followed by LA.

Zeta and Turbidity of Bentonite

The solution was prepared by mixing 1.5 grams of bentonite with 1 liter of deionized water with a homogenizer for 3 minutes. By adding an acid (H+ ions) to the solution dropwise at a time the pH varied from 10 to 2, and the effect of this variation on the turbidity and zeta potential was measured using a turbidity meter (Hach 2100N) and a Zetasizer (ZEN3600), respectively.

The coagulation test was carried in ajar test apparatus (Stuart Flocculator SW6) that consists of six compartments with rectangular paddles.

A range of concentrations varied from $2.98 \times 10^{-3}$ M (0.25 v %) to $1.78 \times 10^{-2}$ M (1.5 v %) was obtained by adding a specific amount of the coagulant to the bentonite suspension followed by a rapid mixing at 180 RPM for 30 seconds and then a slow mixing at 50 RPM for 20 minutes to uniformly disperse the coagulant and encourage floc formation. The formed flocs are then allowed to settle for two minutes before the extraction of the supernatant for the turbidity and zeta potential measurements.

Particle Size Distributions

For the particle size distribution test, the bentonite suspension was prepared by mixing 3 grams of bentonite in 1 liter of deionized water and mixed using a Fisher Scientific homogenizer for five minutes. The coagulation test was carried out using the same procedure for the jar test as in the turbidity and zeta potential preparation method. Coagulant concentrations varied from $2.98 \times 10^{-3}$ M (0.25 v %) to $6.76 \times 10^{-3}$ M (6 v %) by adding the required volume to the bentonite suspension using a micro pipet. The formed flocs were allowed to settle for ten minutes before extracting them from fixed position near the bottom of the beaker. The flocs were then analysed using a Mastersizer 2000 (Malvern Instruments).

NADES Thermal Stability

Figure 5A:
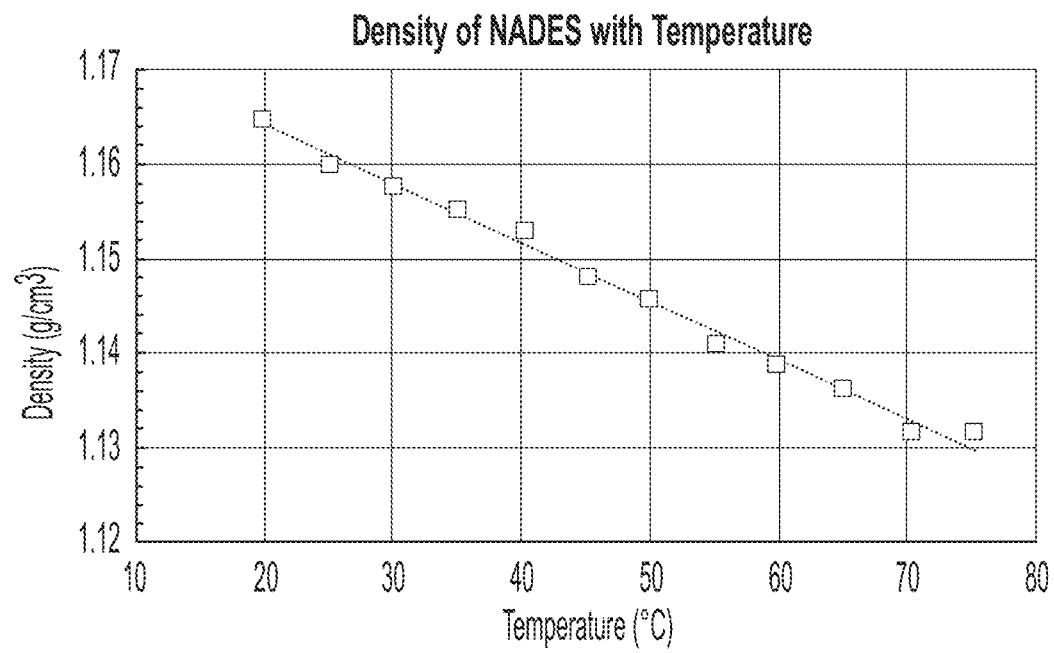
FIG. 5A provides the density of the ChCl:LA NADES with temperature.

FIG. 5A shows the change in the density of the ChCl:LA based NADES with temperature. NADES density at room temperature was found to be 1.16 g/cm$^3$, which is higher than that of pure water. The density exhibits a non-proportional relation with the temperature as it decreases linearly with increasing the temperature. This is due to the increase of the mobility and molecular activity within the solvent with higher temperature and consequently increase in volume.

Figure 5B:
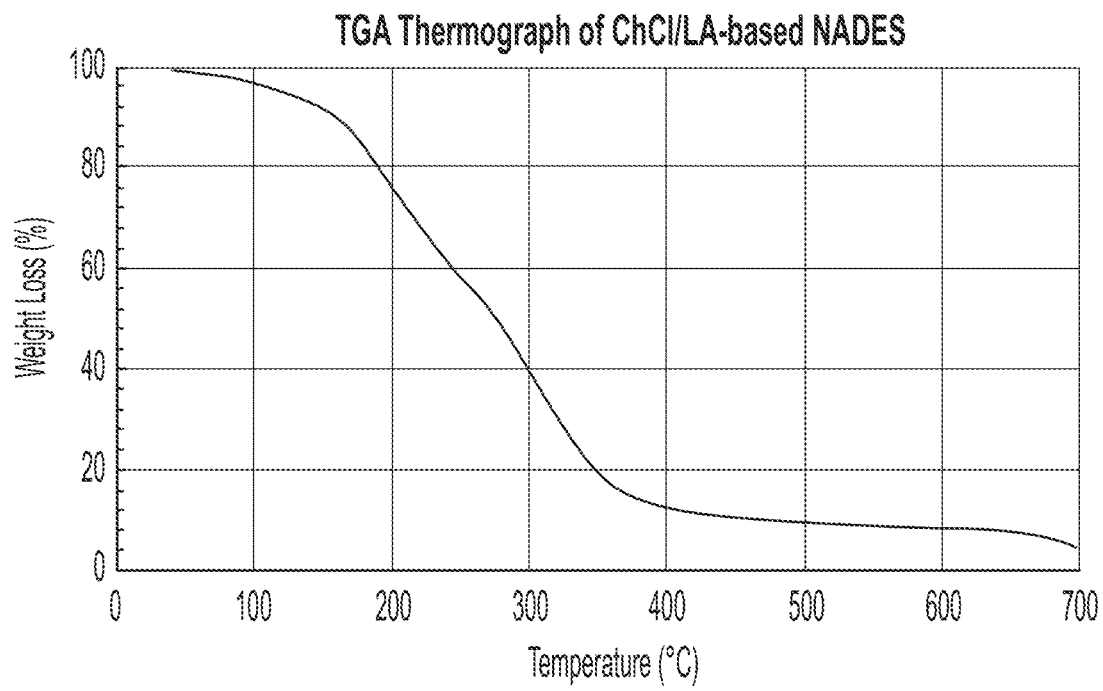
FIG. 5B provides the TGA thermograph of ChCl/LA-based NADES.

The thermal behavior of the prepared NADES was studied using TGA over a temperature range of 30° C. to 700° C. (FIG. 5B). Thermal stability alongside with the decomposition temperature of NADES are important factors to consider while using for different applications. Decomposition of ChCl:LA based NADES illustrate a single step degradation with a decomposition temperature of ~190° C. The attained results for both density and TGA were in good agreement with the literature.

pH Dependence Zeta and Turbidity of Pure Bentonite

Figure 6:
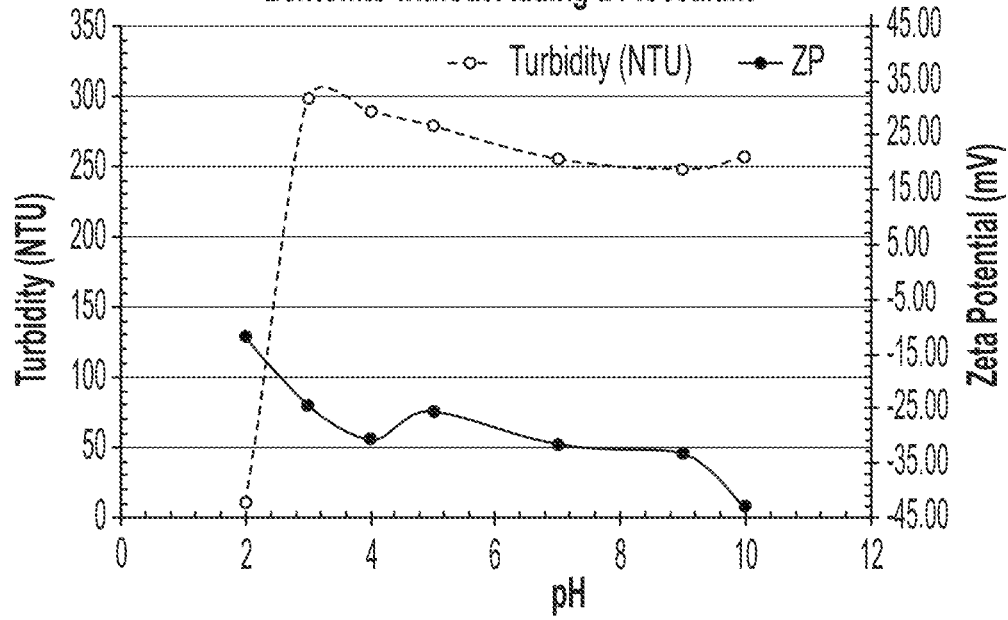
FIG. 6 provides the effect of initial pH on the turbidity and zeta potential of bentonite without adding a flocculant.

A study on the effect of varying the pH of bentonite suspension on its turbidity and zeta potential was conducted (FIG. 6). At initial conditions (pH 10), both the edge and the face of bentonite surfaces were negative, and therefore, the turbidity and zeta potential were 260 NTU and −45 mV, respectively. Upon adding the H+ ions, the pH starts to decrease gradually with no significant change in the turbidity measurements. Once the pH reaches 2, a drastic decrease in turbidity is noticed, which resulted in a relatively clear supernatant. This is due to the change of the edges charge from negative to positive in highly acidic environment, which encourage the edge—face attraction between the bentonite particles and reduce their suspension.

With reducing the pH of the solution towards more acidic conditions, the zeta measurements of the supernatant move towards a more positive potential gradually; due to the decrease in the negative charge on the particles and hence reducing the repulsion forces between them.

In this study, high stable bentonite dispersion at pH 10 were used in the experiments. Destabilization and separation of stable colloidal dispersions at high pH is a challenge in many industrial wastewater treatments.

Zeta and Turbidity of Coagulated Bentonite

Turbidity is defined as the degree of cloudiness of a given system. Highly turbid systems are very stable and usually associated with a highly positive or a highly negative zeta potential. According to the world, health organization (WHO) turbidity of 5 NTU or below is acceptable for agriculture and drinking water and ideally drinking water should have a turbidity of 0.1 NTU.

FIGS. 7, 8, 9, and 13 show the turbidity and zeta potential behavior for a coagulated bentonite suspension with four different additives (a) ChCl, (b) ChCl-LA, (c) NADES, and (d) LA, respectively. Table 1 summarizes the turbidity and zeta potential for bentonite suspensions before and after the coagulants addition. A concentration of $1.78 \times 10^{-2}$ M was selected for comparison. Before the addition of coagulant, both the edge and face of the bentonite particles were negatively charged with a zeta potential of −45 mV and a high turbidity of 347 NTU (FIG. 6).

Figure 7:
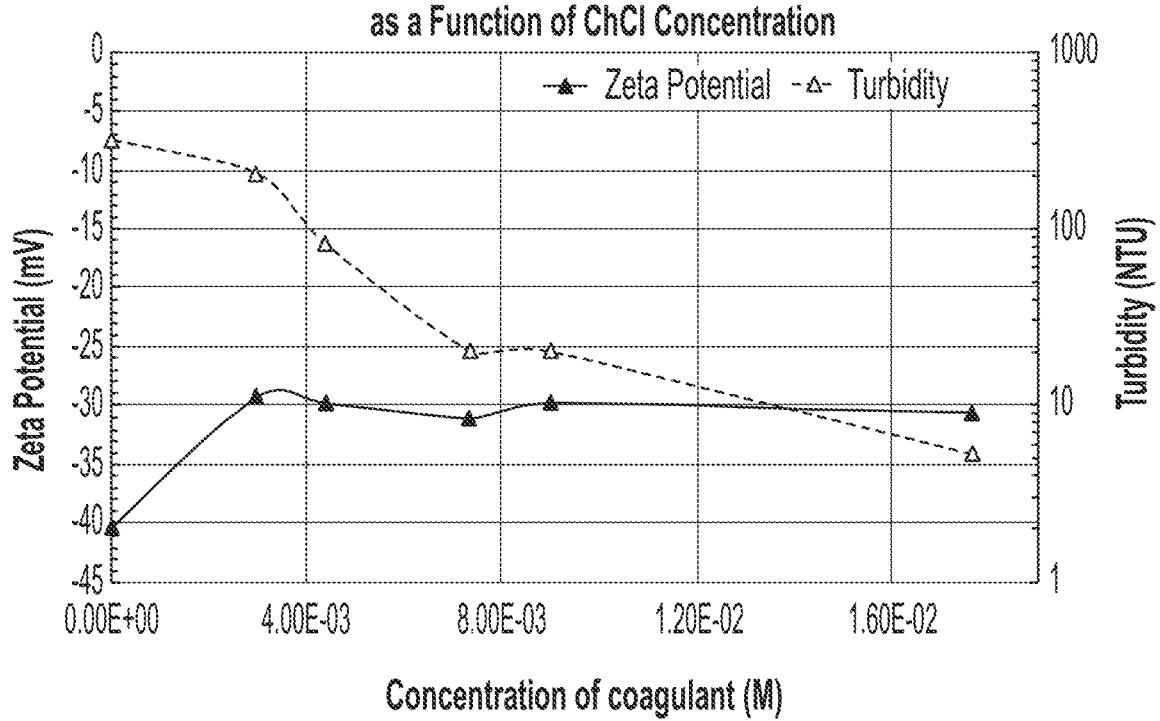
FIG. 7 provides the turbidity and zeta potential of bentonite suspension as a function of ChCl concentration.
Figure 8:
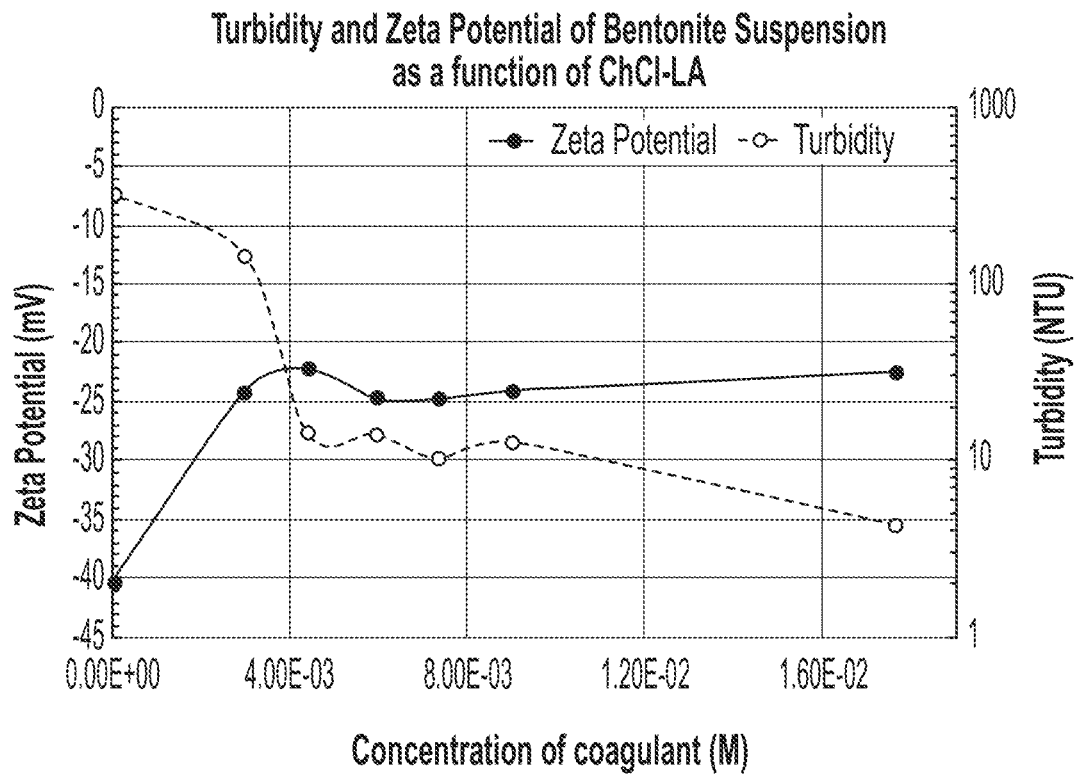
FIG. 8 provides the turbidity and zeta potential of bentonite suspension as a function of ChCl-LA.
Figure 9:
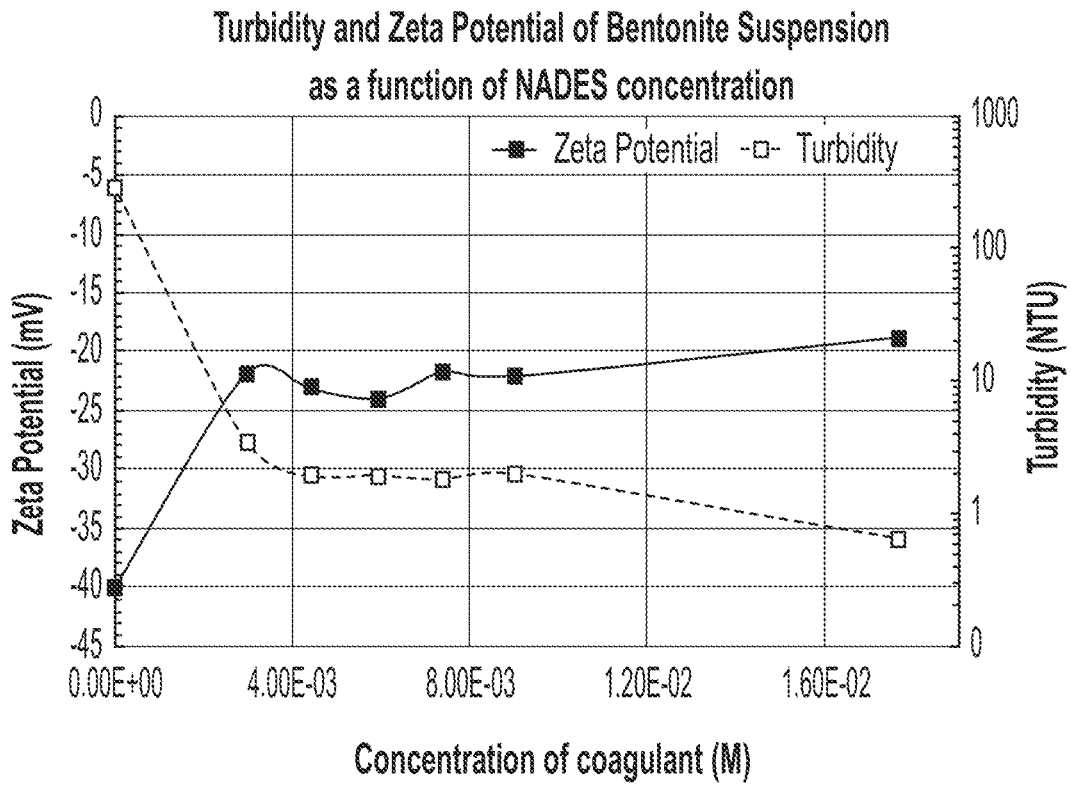
FIG. 9 provides the turbidity and zeta potential of bentonite suspension as a function of NADES concentration.

To investigate the effectiveness and the efficiency of the NADES, its individual components were used as a coagulant for bentonite suspension following the same procedure for all coagulants. In FIG. 7, the results of turbidity and zeta potential measurements for bentonite suspension with ChCl as coagulant are shown. A reduction in zeta potential to around −30 mV is obtained at a concentration of $1.78 \times 10^{-2}$ M, possibly because of the positive charges presented in the choline chloride structure. Furthermore, choline chloride was effective in producing a relatively clear supernatant with a removal percentage of 98%. The pH of the dispersion remained constant for ChCl applied doses.

A combination of ChCl and LA coagulants were added to the same bentonite suspension one after the other to further examine the performance of the prepared NADES. The zeta potential and the turbidity results are displayed in FIG. 8. The results showed that turbidity removal of 98.8% was achieved and zeta potential is reduced to −22 mV. The ChCl-LA mixture performed in a very similar way to the ChCl; however, the reduction in zeta potential was more significant in the ChCl-LA (e.g., from the reduction in pH as a result of adding LA). As the pH of the solution moves towards more acidic conditions, the zeta measurements of the supernatant moves toward a more positive potential gradually from the decrease in the negative charge on the particles, which reduces the repulsion forces between them.

The addition of NADES (FIG. 9) to the bentonite suspension led to a significant reduction in the magnitude of the zeta potential to reach −18.8 mV at a concentration of $1.78 \times 10^{-2}$ M. Consequently, the turbidity of the supernatant decreased to almost null turbidity (0.653 NTU) resulting in a very clear supernatant. Without intending to be limited by theory, the high turbidity removal percentage associated with negative zeta potential can be attributed to the electrostatic patch coagulation mechanism where turbidity is efficiently removed without fully neutralizing the particles surface.

NADES performed better and required lower dose compared to the other two additives. Although adding NADES to water normally causes break down the NADES to its original component ChCl and LA, the coagulation mechanism under high mixing speed is a fast process, too. Hence, higher molecular weight (longer chain) NADES was more efficient as coagulant than using ChCl and ChCl-LA. This finding can be explained in the particle size section.

Proposed Coagulation Mechanism

Figures 10A, 10B:
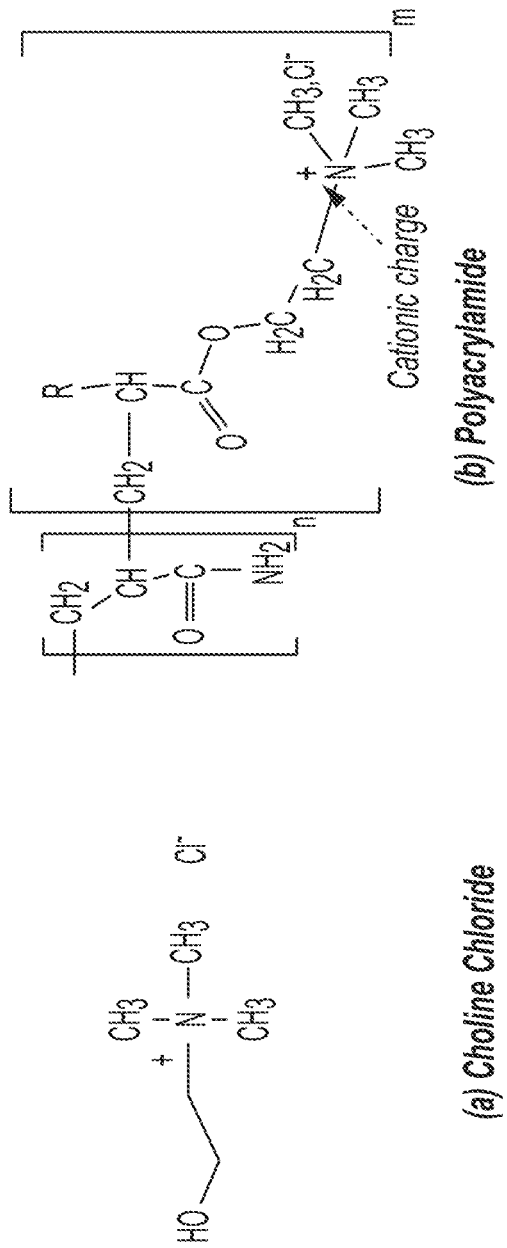
FIG. 10A provides the chemical structure of choline chloride (ChCl).
FIG. 10B provides the chemical structure of polyacrylamide.

FIG. 10 below shows the structure of high molecular weight cationic polyacrylamide (PAM) and choline chloride (ChCl) structure. Both components have similar active functional amide group. The number of the active functional groups on the PAM surface depend on the PAM molecular weight, while choline chloride has only one active group.

Figure 11:
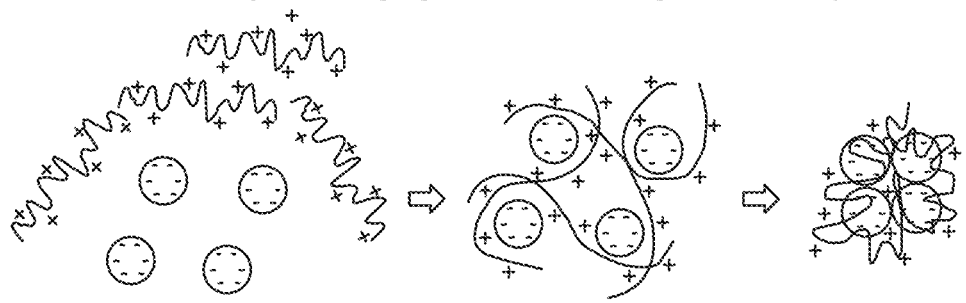
FIG. 11 shows a possible bridging mechanism using cationic polymer.

Flocculation of bentonite using PAM occurs through the adsorption of polyacrylamide primary amide functional groups onto the edge surface of bentonite (i.e., aluminol (Al—OH) and silanol (Si—OH) groups) via hydrogen bonding stating that 94% of adsorption takes place at the edge surface. Thus, charge neutralization becomes a major mechanism, where the cationic PAM will locally reverse the particle surface charge. Collision with negative patches on another particle allows bridging (FIG. 11) then aggregation, producing big flocs.

Figure 12:
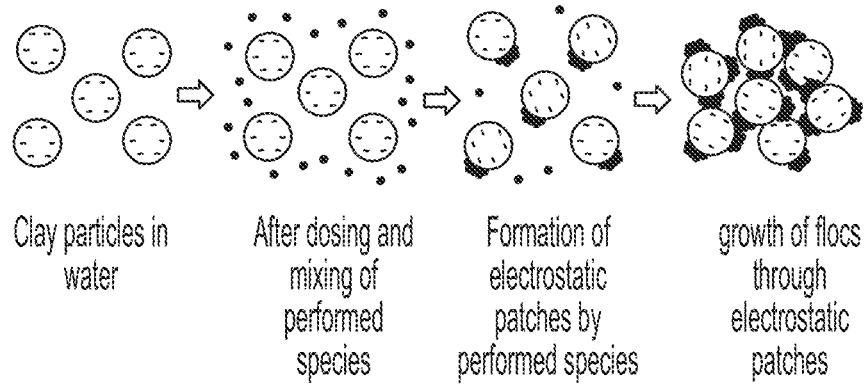
FIG. 12 shows a possible mechanism for coagulation by the electrostatic patch mechanism for ChCl into the bentonite surface.
Figure 13:
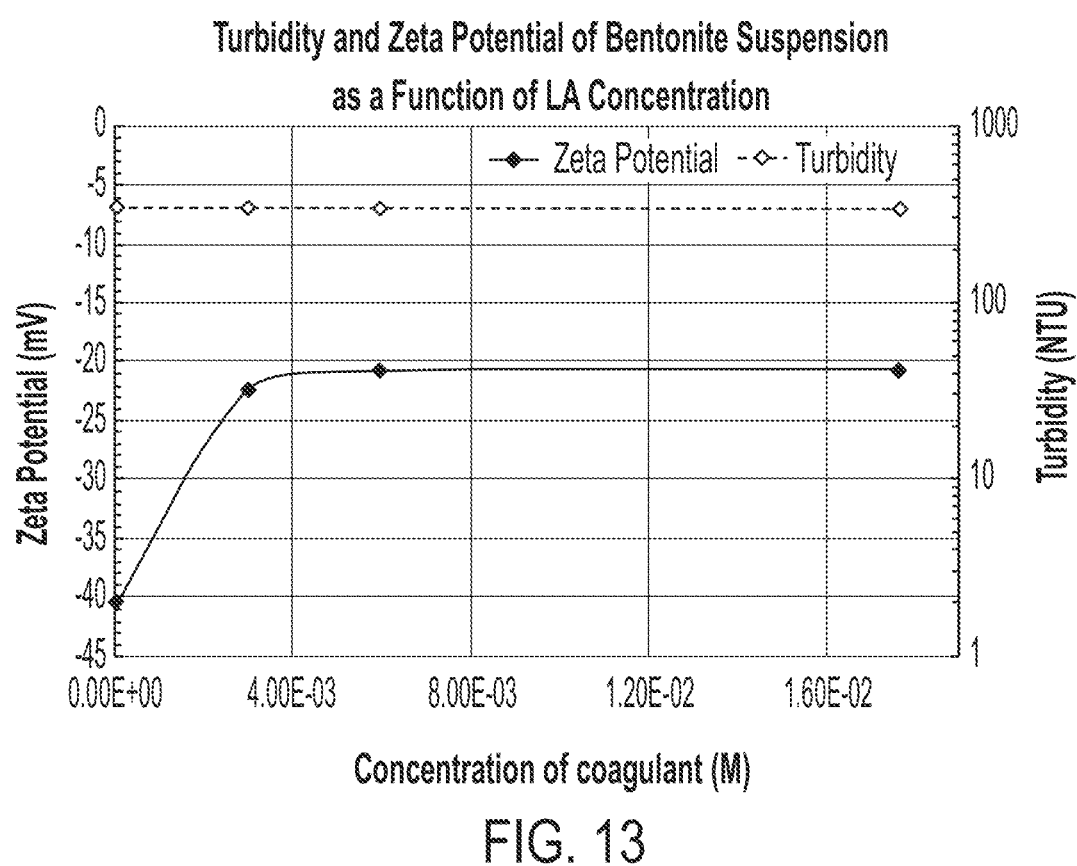
FIG. 13 shows the turbidity and zeta potential of a bentonite suspension as a function of lactic acid (LA) concentration.

Without intending to be bound by theory, strong adsorption does not favor the flocculation process, because strong adsorption can cause surface saturation, preventing effective bridging and destabilizing fine particles. For the choline chloride case, the coagulation can occur through adsorption of amide functional groups onto the edge surface of bentonite (i.e. aluminol (Al—OH) and silanol (Si—OH) groups) via hydrogen bonding. Followed by partially charge neutralization, however, bridging is not possible as in the PAM case. Hence, coagulation occur through electrostatic patch mechanism (FIG. 12) and consequently, the flocs grow through the electrostatic patch forces.

Lactic acid as a coagulant (FIG. 13) was not efficient in terms of turbidity removal as it was in the same range as the bentonite suspension without any addition (336 NTU). A significant drop in the zeta potential magnitude was observed (−22 mV), which is due to the positive charge gained by edges of the bentonite particles in acidic environments (pH<7). This is supporting evidence that the acidic environment was not responsible for the high removal percentage achieved when the NADES was utilized.

ChCl and ChCl-LA coagulants showed similar behaviour as NADES; electrostatic patch coagulation was observed when choline chloride was utilized to destabilize suspended particles as well as ChCl-LA. However, higher dosage of ChCl and ChCl-LA are required to achieve the same performance level as NADES. Hence, the reaction between the hydrogen bond donor and acceptor to connect via hydrogen bond makes a significant effect on the quality of the resultant supernatant.

Both components of the natural deep eutectic solvent—ChCl and LA—had an effect on the bentonite suspension in terms of turbidity removal and zeta potential.

TABLE 1

Coagulant Dosage with Corresponding Turbidity and Zeta Potential

| Coagulant | Coagulant Concentration (Molar) | Turbidity (NTU) | Removal % | Zeta potential (mV) |
|---|---|---|---|---|
| Without | — | 347 | — | −45 |
| ChCl | $1.76 \times 10^{-2}$ | 5.32 | 98.5 % | −30.6 |
| LA | $1.76 \times 10^{-2}$ | 336 | 3.2 % | −20.8 |
| NADES (ChCl: LA) - (1:1) | $1.76 \times 10^{-2}$ | 0.653 | 99.8% | −18.8 |
| ChCl-LA | $1.76 \times 10^{-2}$ | 4.29 | 98.8 % | −22.5 |

Figure 14:
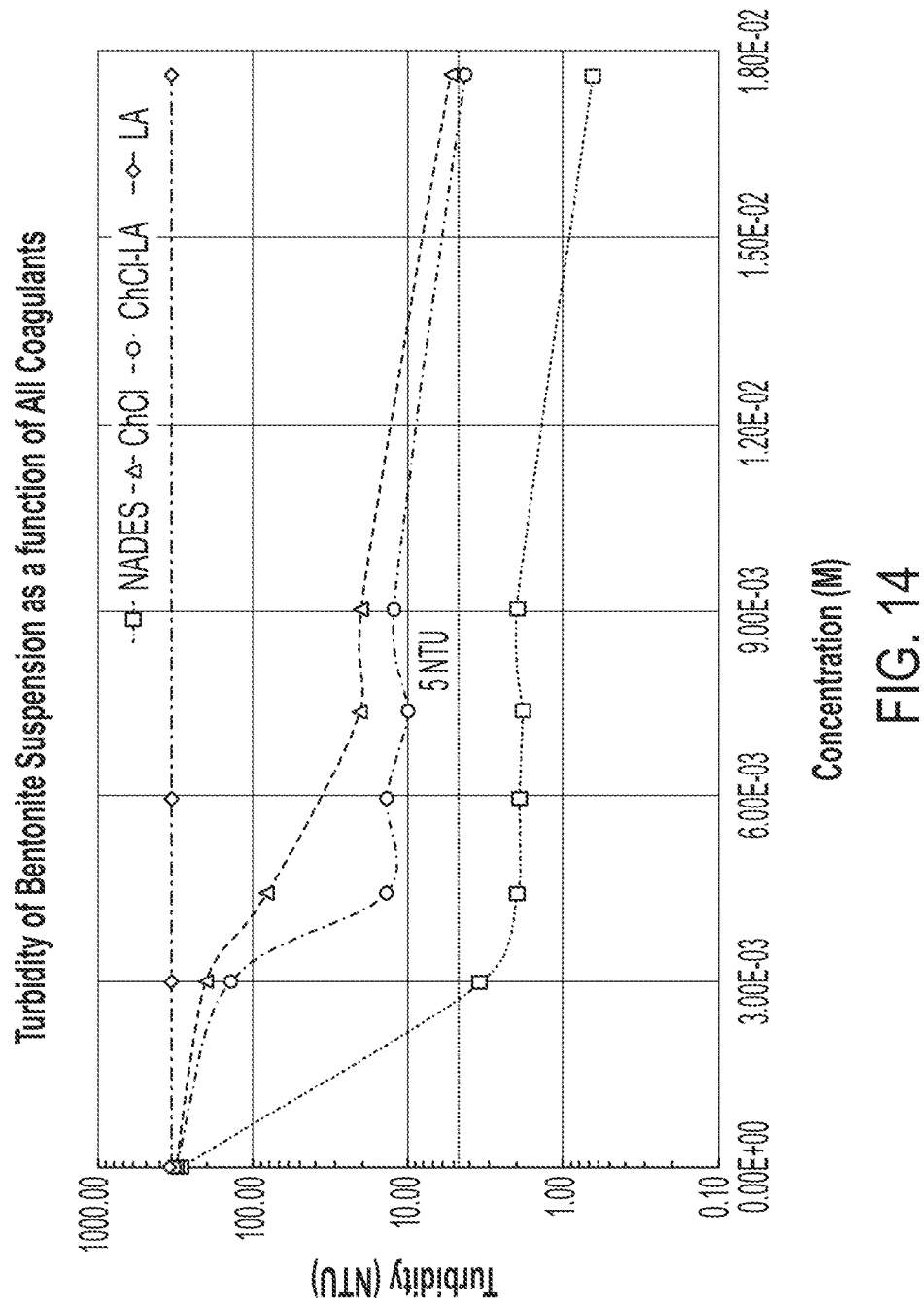
FIG. 14 shows the turbidity of a bentonite suspension as a function of several coagulents listed in Table 2: a negative control, 1:1 NADES, ChCl-LA, ChCl, and LA.
Figure 15:
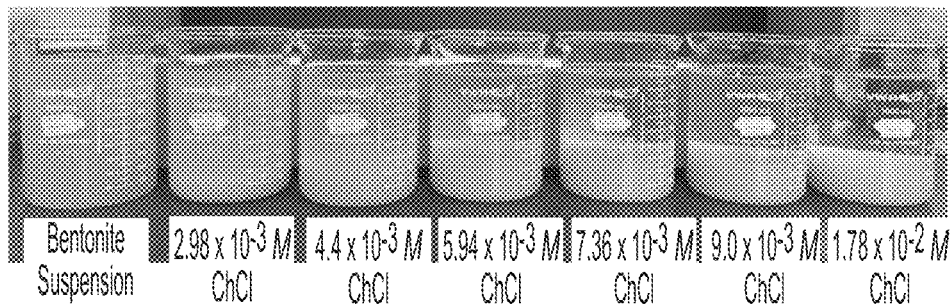
FIG. 15 shows a bentonite suspension with ChCl coagulant at different concentrations.
Figure 16:
FIG. 16 shows a bentonite suspension with 1:1 NADES coagulant at different concentrations.
Figure 17:
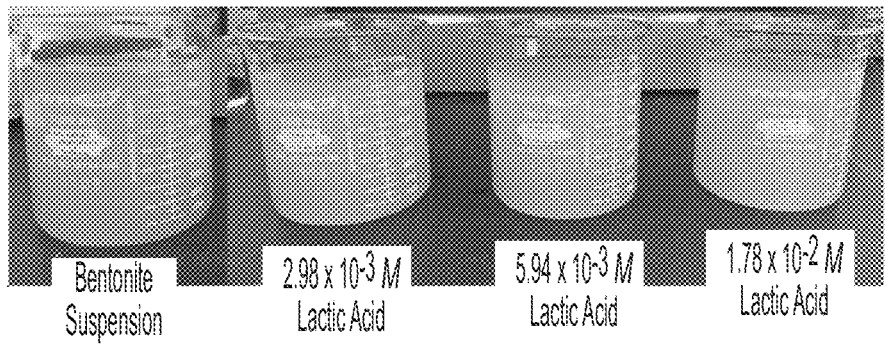
FIG. 17 shows a bentonite suspension with LA coagulant at different concentrations.

To further show the effectiveness of each coagulant, a turbidity of ~5 NTU and below was proposed as a standard value as maximum turbidity allowed for agriculture and drinking water. FIG. 14 and Table 2 show that the corresponding concentration of each coagulant at which the turbidity of the supernatant is equal or below 5 NTU. Only two coagulants, which are NADES and ChCl-LA mixture, were able to achieve a turbidity of 5 NTU at a concentration of $2.80 \times 10^{-3}$ M and $1.69 \times 10^{-2}$ M, respectively. However, the needed concentration to achieve the target value using ChCl-LA coagulant was around six times higher than the NADES concentration (see also FIGS. 15 to 17).

TABLE 2

Concentration of Coagulant Required to Achieve Turbidity ≤ 5 NTU
Turbidity ≤ 5 NTU

| Coagulant | Coagulant Concentration (Molar) | Turbidity (NTU) |
|---|---|---|
| Without | NA | NA |
| NADES (1:1) | $2.80 \times 10^{-3}$ | 5 |
| ChCl-LA | $1.69E \times 10^{-2}$ | 5 |
| ChCl | NA | NA |
| LA | NA | NA |

Particle Size Distributions

Untreated bentonite suspension as well as the treated suspensions with four different formulations using different concentrations were examined through a particle size distribution test. The median diameters of the bentonite's flocs are summarized in Table 4. Untreated bentonite suspension shows a median particle diameter of 2.4 µm while the suspension treated with lactic acid at a concentration of $3.48 \times 10^{-2}$ M and $6.76 \times 10^{-2}$ M shows a median particle diameter of 2.5 µm and 3.3 µm, respectively. Thus, the use of lactic acid as a coagulant for bentonite suspension is not effective and any reduction in the turbidity values is due to precipitation of the particles without aggregation.

TABLE 1

Coagulant Dosage with Corresponding Median Floc Diameter

| Coagulant | Coagulant Concentration (Molar) | $D_{50}$ (µm) |
|---|---|---|
| Without | — | 2.5 |
| NADES | $3.48 \times 10^{-2}$ | 21.8 |
| (Ch-Cl: L-A) - (1:1) | $6.76 \times 10^{-2}$ | 36.7 |
| ChCl-LA | $3.48 \times 10^{-2}$ | 14.7 |
| | $6.76 \times 10^{-2}$ | 19.9 |
| ChCl | $3.48 \times 10^{-2}$ | 5.7 |
| | $6.76 \times 10^{-2}$ | 10.5 |
| LA | $3.48 \times 10^{-2}$ | 2.5 |
| | $6.76 \times 10^{-2}$ | 3.3 |

For all three active coagulants represented in NADES, ChCl, and ChCl-LA aggregation occurs by the electrostatic patch coagulation mechanism.

Figure 18:
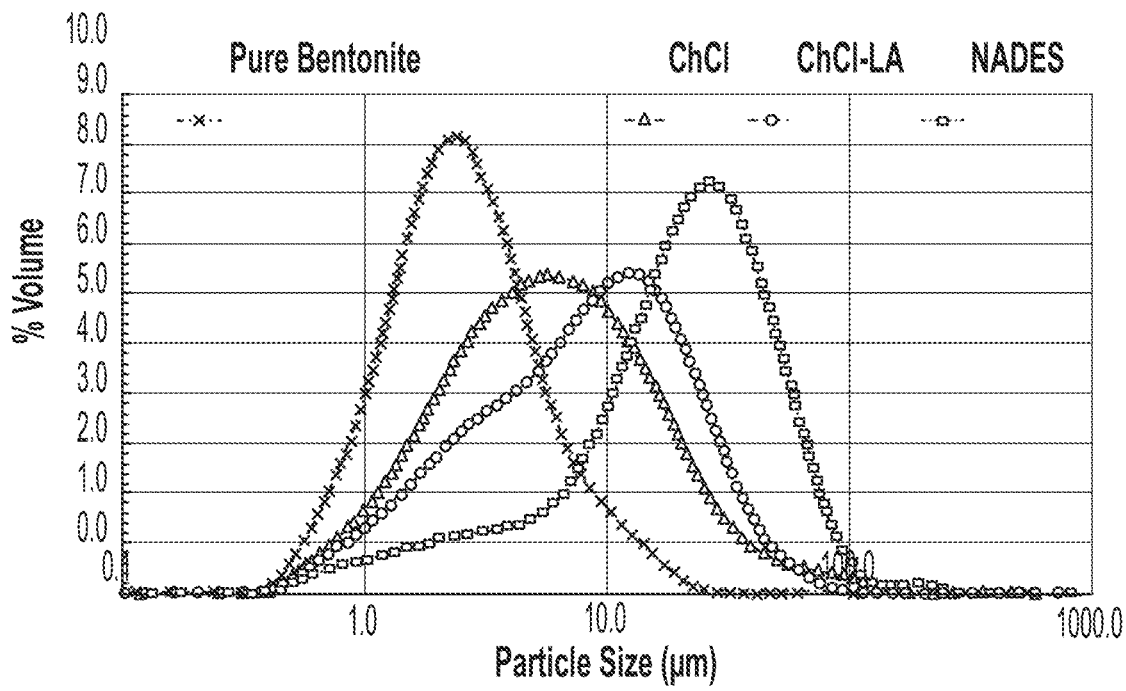
FIG. 18 provides the floc size distribution of bentonite suspension treated with three coagulants at $3.48 \times 10^{-2}$ M.
Figure 19:
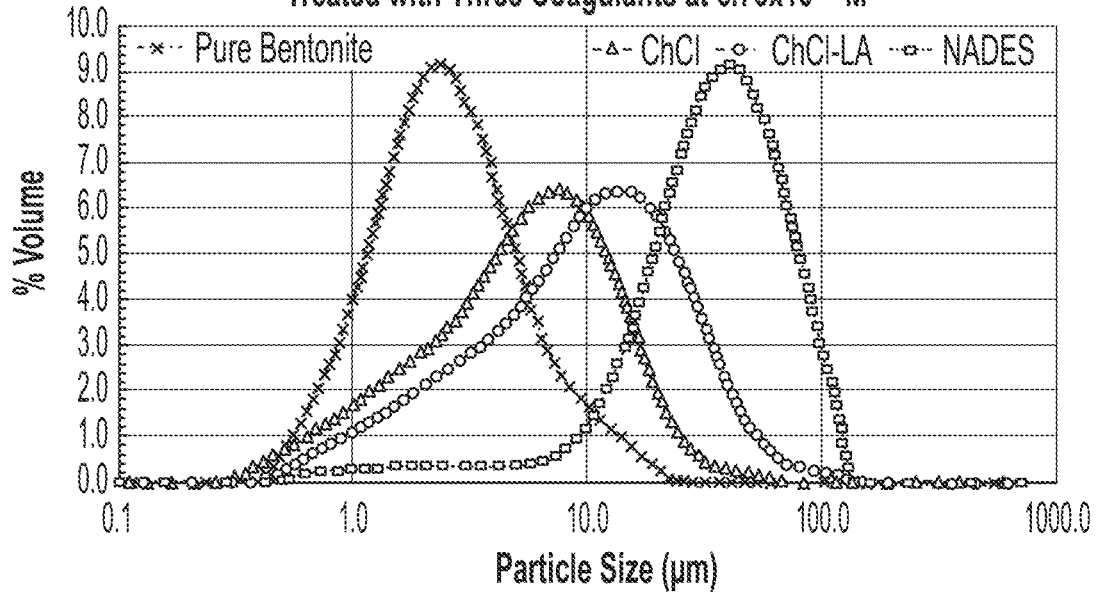
FIG. 19 provides the floc size distribution of bentonite suspension treated with three coagulants at $6.76 \times 10^{-2}$ M.

FIGS. 18 and 19 represent the floc size distribution of the treated suspension with NADES, ChCl, and ChCl-LA at constant concentrations of $3.48 \times 10^{-2}$ M and $6.76 \times 10^{-2}$ M, respectively. NADES resulted in the largest flocs, followed by ChCl-LA and lastly the ChCl coagulant.

Larger flocs were formed by ChCl-LA coagulant than the ChCl coagulant alone. This could be attributed to the positive charge on the bentonite edges due to the presence of lactic acid resulting in acidic environment. Attraction forces between the positively charged edges and the uncovered patches with a negative charge on the particles surface leading to formation of flocs with greater diameter.

Figure 20:
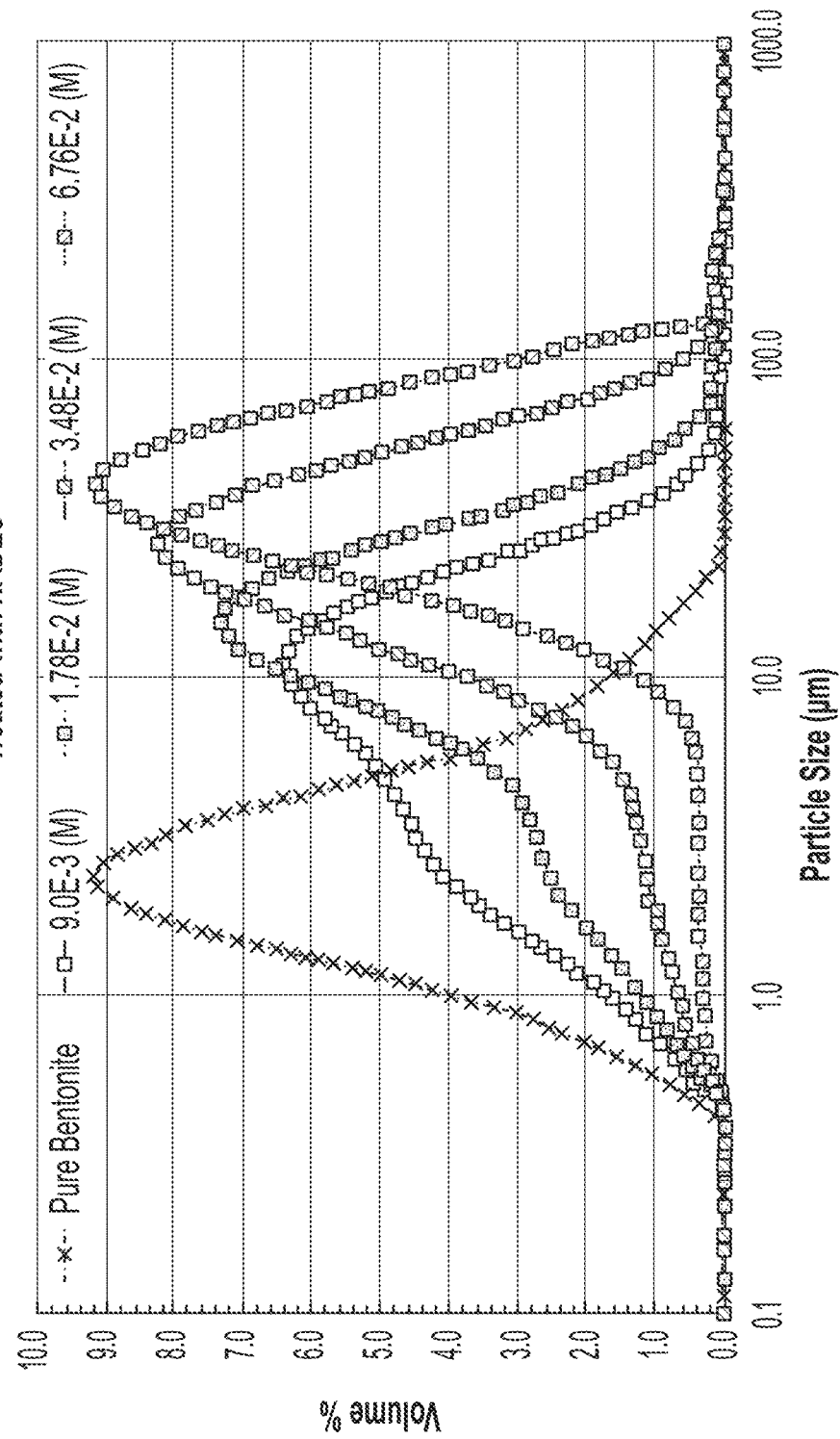
FIG. 20 shows the floc size distribution curves for bentonite suspensions treated with 1:1 NADES.

Consequently, higher dosage of the coagulant results in formation of larger flocs. From FIG. 20 it is observed that as the concentration of NADES coagulant increases the peaks shift to the right of the untreated suspension demonstrating an increase in the floc size. The same behaviour is demonstrated by the two other coagulants. The change in the floc size upon increasing the concentration arises from neutralizing more patches on the particles' surface and further reduction in the repulsion forces. Accordingly, more particles will move closer to each other forming larger flocs.

CONCLUSION

Under these conditions, NADES was the most effective coagulant with almost a nil turbidity (i.e., ~100% turbidity removal), large flocs (36 µm), and low zeta potential (−18 mV) followed by ChCl-LA, ChCl, and lastly LA, for which insignificant reduction in turbidity (3%) was obtained. Moreover, NADES displayed the lowest dosage of the formulations in comparison with ChCl and ChCl-LA. ChCl and ChCl-LA coagulants gave relatively similar outcomes in terms of turbidity while lower zeta potential and larger flocs were achieved using ChCl-LA due to formation of more neutralized patches on the colloidal surface in acidic environment. Low negative zeta potential indicated destabilized system, which leads to coagulation and consequently separation of solid particles. In addition, the larger floc sizes suggest faster separation.

All publications and patent, applications cited in this specification are herein incorporated by reference as if each individual publication or patent application were specifically and individually indicated to be incorporated by reference. While the claimed subject matter has been described in terms of various embodiments, the skilled artisan will appreciate that various modifications, substitutions, omissions, and changes may be made without departing from the spirit thereof. Accordingly, it is intended that the scope of the subject matter limited solely by the scope of the following claims, including equivalents thereof.

What is claimed:

1. A method for removal of suspended colloidal particles from wastewater effluents comprising treating the wastewater with a green natural deep eutectic solvent (NADES) coagulant comprising a hydrogen bond acceptor and a hydrogen bond donor; stirring the treated wastewater; settling the treated wastewater; and extracting the supernatant.

2. The method of claim 1, wherein the suspended colloidal particles comprise bentonite, kaolinite, barite, and precipitated calcium carbonate.

3. The method of claim 1, wherein the turbidity of the treated wastewater is 5 NTU or less zero as measured by a turbidity meter.

4. The method of claim 3, wherein the turbidity is 0.653 NTU or below.

5. The method of claim 1, wherein the resulting settled sediment comprises flocs with a diameter ($D_{50}$) of 36 µm, as measured by a floc size measuring device.

6. The method of claim 5, wherein the coagulant is added at a dose where the treated wastewater turbidity is 5 NTU or less.

7. The method of claim 6, wherein the method further comprises aggregating via an electrostatic patch coagulation mechanism.

8. The method of claim 1, wherein the treated wastewater has a zeta potential of −18 mV, as measured by a zeta potential measuring device.

9. The method of claim 1, wherein the hydrogen bond acceptor is choline chloride.

10. The method of claim 9, wherein the hydrogen bond donor is selected from the group consisting of lactic acid, malic acid, citric acid, acetic acid, phenylacetic acid, trifluoroacetic acid, and trichloroacetic acid.

11. The method of claim 10, wherein the hydrogen bond donor is acetic acid.

12. The method of claim 10, wherein the molar ratio of choline chloride to the hydrogen bond donor is 1:1.

13. The method of claim 1, wherein the wastewater is stirred at a speed of 180 rpm for thirty seconds.

14. The method of claim 1, wherein the wastewater is stirred at a speed of 50 rpm for 20 minutes.

15. The method of claim 1, wherein the treated wastewater has a 100% total suspended solids (TSS) removal at a range of high pH from 3 to 9.

16. The method of claim 1, wherein the treated wastewater was settled for two minutes.

17. The method of claim 1, wherein the wastewater has a pH of 9.

18. The method of claim 1, wherein the wastewater is selected from the group consisting of oil and gas processing effluent, pulp and paper processing effluent, mineral processing effluent, tailing and tanning processing effluent, paint processing effluent, and ceramic processing effluent.

* * * * *